US006054992A

United States Patent [19]
Gibson

[11] Patent Number: 6,054,992
[45] Date of Patent: Apr. 25, 2000

[54] CUTTING, JOINTING AND TEARING VOLUMETRIC OBJECTS

[75] Inventor: Sarah F. Gibson, Arlington, Mass.

[73] Assignee: Mitsubishi Electric Information Technology Center America, Inc., Cambridge, Mass.

[21] Appl. No.: 08/933,393

[22] Filed: Sep. 19, 1997

[51] Int. Cl.[7] .................................................. G06T 17/00
[52] U.S. Cl. ............................................................ 345/424
[58] Field of Search .................................. 345/419, 420, 345/424

[56] References Cited

U.S. PATENT DOCUMENTS

| | | | |
|---|---|---|---|
| 4,719,585 | 1/1988 | Cline et al. ............................. | 345/424 |
| 4,985,856 | 1/1991 | Kaufman et al. ...................... | 345/424 |
| 4,987,554 | 1/1991 | Kaufman ................................ | 345/424 |
| 5,734,384 | 3/1998 | Yanof et al. ............................ | 345/424 |
| 5,831,623 | 11/1998 | Negishi et al. ........................ | 345/419 |

OTHER PUBLICATIONS

"Extraction and Reuse of Partial Forms on 3D Solid Models Generated with Geometric Constraints"; *IBM Technical Disclosure Bulletin*, vol. 38, No. 1, Jan. 1995, pp. 47–48.

B. Pflesser et al.; "Towards Realistic Visualization for Surgery Rehearsal"; Proceedings, Computer Vision, Virtual Reality and Robotics in Medicine. First International Conference, Nice, France, Apr. 3–6, 1995; pp. 487–491.

Ming–Dar Tsai et al.; "Volume Manipulation Algorithms for Simulating Musculoskeletal Surgery"; Fourth Pacific Conference on Computer Graphics and Applications; Aug. 19–22, 1996; pp. 220–234.

J. K. Udupa et al.; "Fast Visualization, Manipulation, and Analysis of Binary Volumetric Objects"; *IEEE Computer Graphics and Applications*, vol. 11, No. 6; Nov. 1991; pp. 53–62.

*Primary Examiner*—Mark R. Powell
*Assistant Examiner*—Huedung X. Cao
*Attorney, Agent, or Firm*—Dirk Brinkman

[57] ABSTRACT

A linked volumetric representation for graphical objects is presented together with techniques for physically-plausible modeling of object cutting, joining and tearing. In one embodiment, each element is may be explicitly linked to its six nearest neighbors by storing pointers to those neighbors in the element's data structure. The link between two elements can be cut when a graphical representation of cutting tool passes between the elements by setting the appropriate neighbor pointers in the two elements to point to NULL instead of to each other. If material limits in the link between two elements are exceeded during simulation of object deformation, the link can be torn apart by setting the appropriate neighbor pointers in the two elements to NULL. When a joining tool is applied to two volumetric objects in close proximity, edge elements in the two objects that have complimentary neighbors set to NULL can be joined by setting these missing neighbors to point to each other.

20 Claims, 16 Drawing Sheets

```
typedef struct 3DElement{
        char    type;       /*element type for material properties, object ID, etc.*/
        char    r, g, b;    /*element color*/
        float   x,y,z       /*element position*/
    struct 3DElement *right, *left, *top, *bottom, *back, *front;
                            /*pointers to neighboring elements*/
}
```

⇩

⇩

CUTTING, JOINTING AND TEARING VOLUMETRIC OBJECTS

BACKGROUND OF THE INVENTION

The present invention pertains to volume graphics and more specifically, to a technique for graphically modeling the cutting of volumetric objects along an arbitrary cutting path, the joining together of volumetric objects of arbitrary shape at an arbitrary surface, and the tearing of deformable volumetric object models when they are pulled apart.

Computer based simulation has many applications. One such application involves surgical simulation. Computer based surgical simulation has application in surgical training, education, surgical planning and with intraoperative assistance. In medical education and training, surgical simulation can reduce costs associated with cadaver specimens, provide experience with a greater variety of pathologies and complications that would normally be encountered in practice, and provide the ability to repeat or replay training procedures. In surgical planning, simulators enable rehearsal of difficult procedures or planning of surgeries involving patient specific anatomies. Intraoperatively, computer modeling can aid in navigation by augmenting the limited surgical field with a more global view of the patient's anatomy and may provide guidance, for example, by warning the prospective surgeon with respect to intrusion into regions where harm could be caused to the patient.

In order to provide useful feedback to the user, surgical simulators must provide adequate realism. Tissue models should respond in a realistic way when they are manipulated. Rendered images of the surgical field must be realistic enough to be compelling. Haptic or force feedback must mimic forces experienced in real life because the sense of touch provides important cues in surgery. These requirements impose significant demands on the surgical simulator and more particularly, they require physically realistic modeling techniques which simulate soft tissue deformation, tissue cutting, tearing or joining.

In computer modeling, digital models of physical objects are manipulated to simulate or predict real-world behavior. In physics-based graphics, physical laws are used to model interactions such as collisions between object models or the deformation of soft objects. Physically-plausible implies that the physical modeling has the appearance of being realistic even though it may not be strictly accurate. Physically-plausible simulations can be much less computationally intensive than physically-realistic simulations but they are often sufficient in applications such as character animation, high-level design or education.

In surface-based graphics, graphical objects are represented by a set of contiguous surface elements such as polygons or curved spline patches. Modeling of cutting through surface-based objects is difficult because new contiguous surfaces must be constructed along the cutting path. If the cut can be made through arbitrary positions in the model, construction of cutting plane surfaces can be quite difficult. In addition, because object interiors are not represented in surface models, interior structure at the cut must be fabricated over the cutting surface so that the cut looks realistic.

In volume graphics, objects are represented as three dimensional arrays of sampled data elements. Volumetric models represent both object surfaces and object interiors. Because object interiors are represented, it is possible to model volumetric deformations (see "3D ChainMail, a fast algorithm for deforming volumetric objects", by S. Gibson, in Proc. CVRMed/MRCAS 97, pp. 369–378, Grenoble, Fr. 1997) and to use the internal detail both for influencing the cut path (for example if the cut path encounters a dense structure inside the object) and for modifying the appearance of the surface exposed by the cut.

Sculpting of volumetric objects has been performed by others such as: Galyean and Hughes in "Sculpting: An interactive volumetric modeling technique", Proc. SIGGRAPH 91, Las Vegas, Nev., pp. 267–274, July, 1991; S. Wang and A. Kaufman in "Volume Sculpting, Proc. 1995 Symp. on Interactive 3D Graphics", Monterey, Calif., pp. 151–156, May, 1995; and R. Avila and L. Sobierajski in "A haptic interaction method for volume visualization", Proc. IEEE Visualization 96, pp. 197–204, San Francisco, Calif., October, 1996. In these methods, objects are represented by a static array of regularly spaced intensity values, where the sample intensities correspond to tissue density or the amount of material at that sample point. (For example, a density of 1 might correspond to solid material or a "full" sample, and a density of 0 might corresponds to empty space.) Sculpting or editing of the volume is performed by changing the sample density values near the sculpting tool. For example, "carving" sets to zero density values in elements of the array that are underneath the tool, "melting" reduces the density of voxels underneath the tool proportionally with the time that the tool is over an array element, and "spraying" adds material by increasing the density of voxels underneath the tool up to the maximum density of 1.

While these volumetric sculpting techniques have potential applications in volume editing and geometric design, it is important to note that the resultant array of intensity values lacks the physical sense of being an object. Once pieces in the array are "carved" away from the rest of the volume, they cannot be manipulated as individual objects. Material is created and dissolved into thin air, so that these applications do not realistically model real sculpting. In addition, it is not clear how this representation could be extended for sculpting deformable materials.

Finite element methods can be used to model deformable objects. Like volumetric methods, finite element methods use a three dimensional mesh of node points. The dynamics of these systems can be predicted by solving large systems of simultaneous ordinary differential equations with dimensionality proportional to the number of nodes in the discrete model. Finite element methods give physically realistic behavior, however, they are computationally intensive. Additionally, arbitrary cutting through the three dimensional mesh requires remeshing of the model. This remeshing is required for accurate simulations because smaller meshes are required at high stress points (for example the tip of the knife).

Terzopoulos and Fleischer model fracturing of a discrete mesh representation of deformable tissues in "Modeling inelastic deformation: viscoelasticity, plasticity, fracture", Proc. SIGGRAPH 88, Computer Graphics, Vol. 22, pp. 269–278, 1988. However, in their model, fracturing results from zeroing material property weighting functions at particular mesh nodes rather than an explicit removal of a connection between two linked elements as in the subject invention.

Modeling, cutting or tearing of three dimensional objects is difficult with surface-based representations because new surfaces must be constructed along the arbitrary knife path. In addition, because surface-based models do not represent object interiors, cutting or tearing through these models requires fabricating the interior structure to provide color or texture for the cut surface.

Current volumetric sculpting methods assume that the object is a static three dimensional array of density values. These density values are increased or decreased to represent addition or removal of material but there is no way to physically simulate the actions of cutting, tearing, or joining. Objects that are created, cut apart, or joined have no physical properties that can be used for physics-based modeling

SUMMARY OF THE INVENTION

In accordance with the present invention, a method is disclosed for generating physically-plausible models of interactions with objects, such as cutting through objects, tearing of objects, or the of joining objects at arbitrary surfaces.

An object representation is disclosed, along with techniques which facilitate the manipulate the object representation, so that procedures such as object cutting, tearing and joining can be modeled. Simulation of these actions is important for physically-realistic modeling, and has application in such fields as surgical simulation, character animation and cloth modeling for manufacturing.

In the presently disclosed modeling technique, a volumetric model is augmented with connecting links between neighboring elements. Interactive object manipulation techniques use this representation, allowing links to be created and destroyed according to the paths traversed by a simulated tool, such as a cutting tool or a joining tool. These techniques allow the physically-plausible simulation of object cutting, tearing and joining.

With a volumetric object representation, the interior structure that is revealed by cutting or tearing does not have to be fabricated since it is stored in the object representation. By representing an object as an array of linked elements, objects can take on the properties of real materials; i.e. objects can be deformed when forces are applied, objects that are cut apart can be manipulated individually as two separate objects, tearing of an object can be simulated when an object is stretched apart beyond a specified limit and separate objects can be joined at arbitrary points or surfaces.

BRIEF DESCRIPTION OF THE DRAWINGS

The invention will be more fully understood by reference to the following Detailed Description of the Invention in conjunction with the following drawings of which.

DETAILED DESCRIPTION OF THE INVENTION

Figure 1:
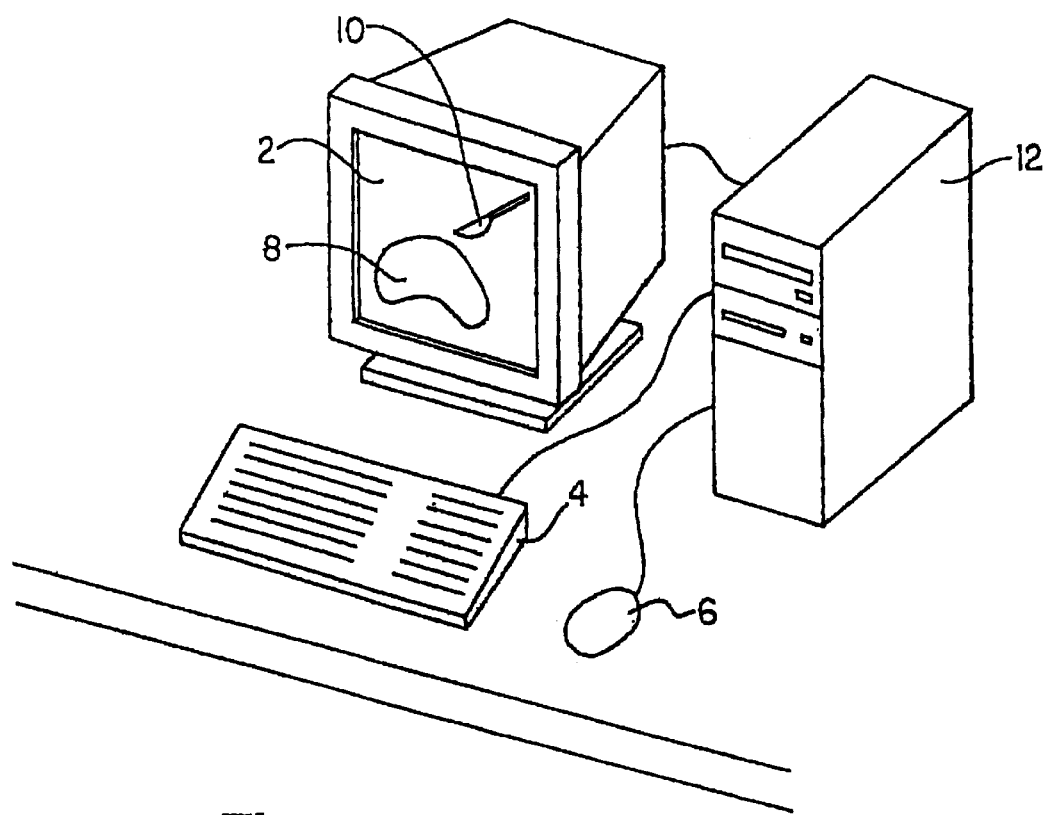
FIG. 1 is a diagrammatic view of a system for simulating carving, tearing, or joining of a graphical object.

Referring to FIG. 1, a system for cutting, tearing, and joining graphical objects includes a computer monitor 2, for visualizing the simulation, a keyboard 4, and/or other input device 6 for controlling an object 8 displayed on the monitor 2, and an acting tool 10 such as the cutting tool 10 and a computer, 12.

Figure 2A:
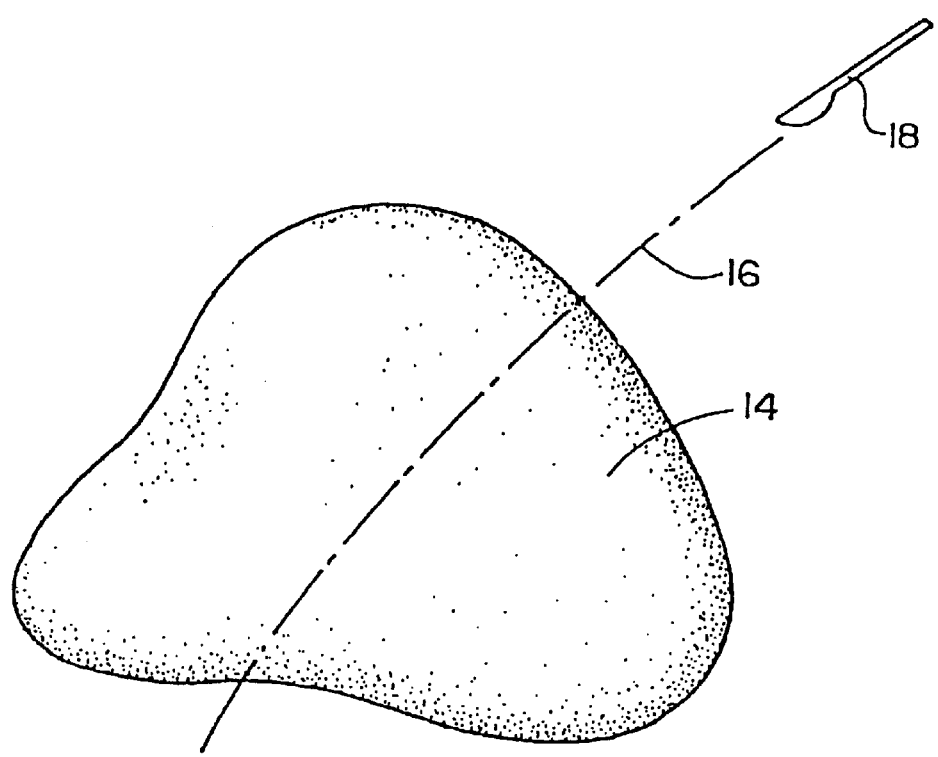
FIG. 2A is a diagrammatic view of a three dimensional graphical object and the cutting path of a graphical cutting tool.
Figure 2B:
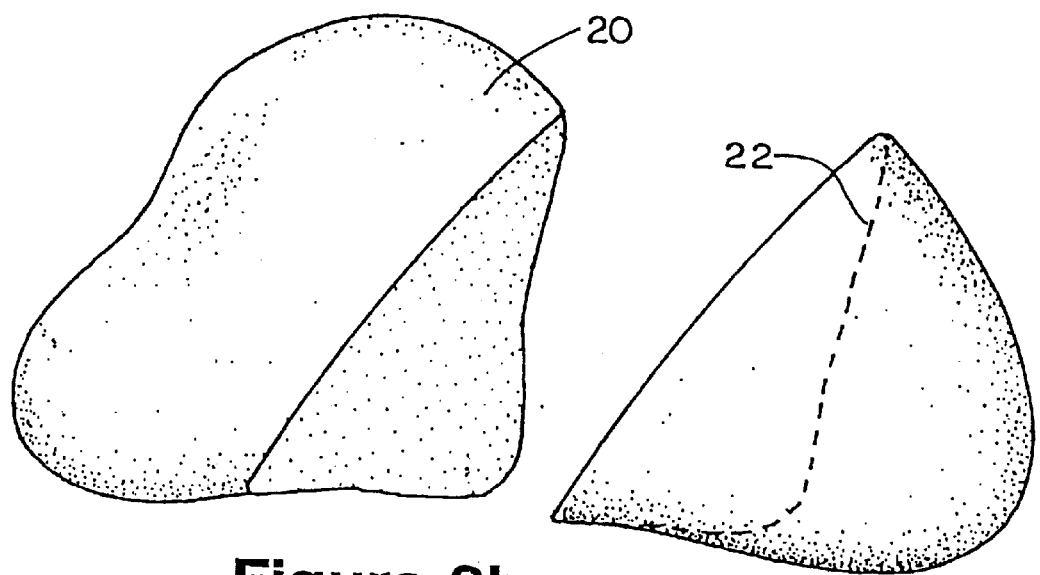
FIG. 2B is a diagrammatic view of the resultant object when a hollow surface-based graphical object is cut.

FIG. 2a illustrates the cutting a graphical object 14, along a tracing path 16 via use of a graphical tool 18, and FIG. 2b illustrates the object of FIG. 2a after slicing with the graphical tool 18. For surface-based objects, the result is first and second hollow pieces 20 and 22 respectively for which a face created as the the consequence of the cutting of the object must be generated.

Figure 3A:
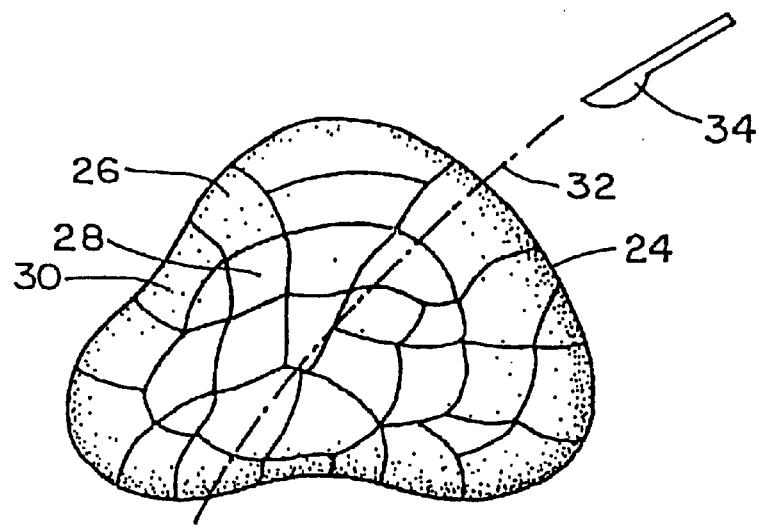
FIG. 3A is a drawing of the surface patches used to represent a surface-based object.
Figure 3B:
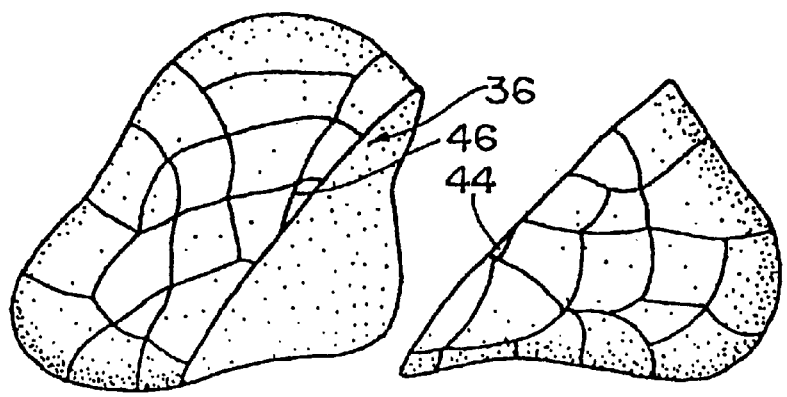
FIG. 3B shows the resultant cutting surface of the cutting tool superimposed on the cut graphical object.
Figure 3C:
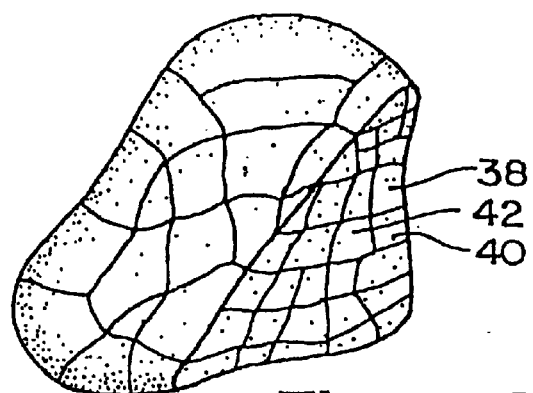
FIG. 3C. shows the cutting surface of the cutting tool after it has been divided into surface patches.

Referring to FIG. 3a, a surface-based object 24 is represented by abutting surface patches, e.g. patches 26, 28, 30. When the object is sliced along the path 32 by the graphical cutting tool 34, a new viewable surface 36 must be created. The new surface 36 is defined by new abutting surface patches, e.g. 38, 40, 42 that lie on the surface determined by the graphical tool 34 cutting path 32. Defining a good set of surface patches for the cut surface is difficult. In addition, the cut can leave small, irregular surface patch pieces on the old object surface, e.g. 44, 46, that are sub-optimal. In addition, because the interior of the object is not represented in the original object, the color and other properties of the surface patches of the cut surface must be fabricated.

Figure 4:
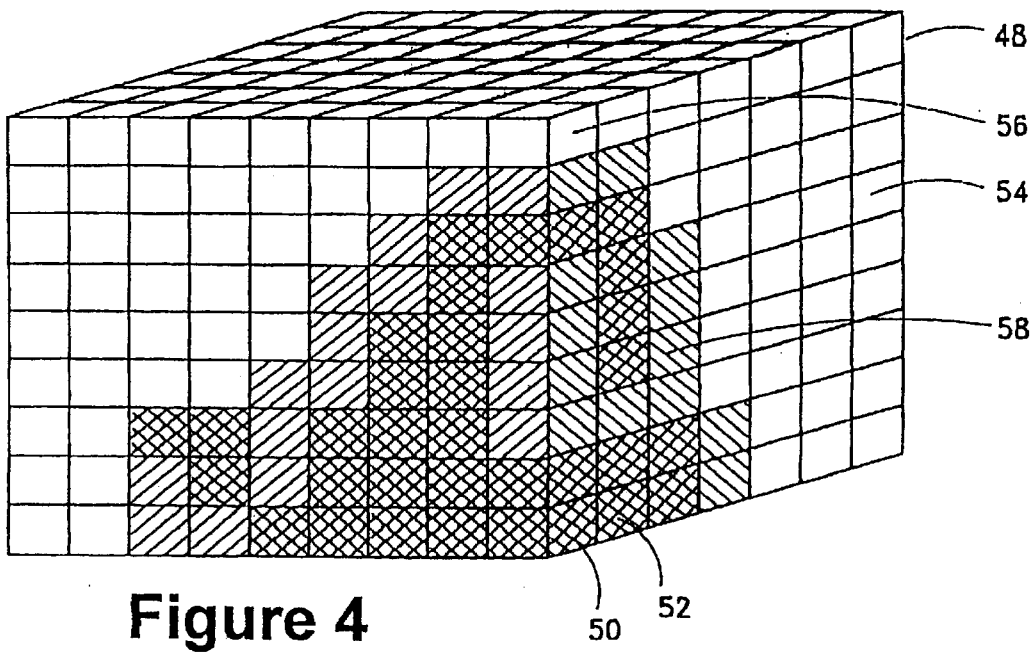
FIG. 4 is a diagram of a volumetric object represented by a three dimensional array of sampled intensity values.

Referring to FIG. 4, prior methods for sculpting volumetric data assume that the data consists of a regular, static block 48 of three dimensional elements, e.g three dimensional blocks 50, 52, 54, 56, and 58 where each element is assigned a density value. A density of 1, implies that the element is full, e.g. elements 50 and 52, while a density of zero indicates that the element is empty, e.g. elements 54 and 56. A density between 0 and 1 indicates a partially full element, e.g. three dimensional block 58. The "fullness" may be defined to corresponded to the density of the material in the modeled object or the fraction of the respective block that comprises object material.

Figure 5:
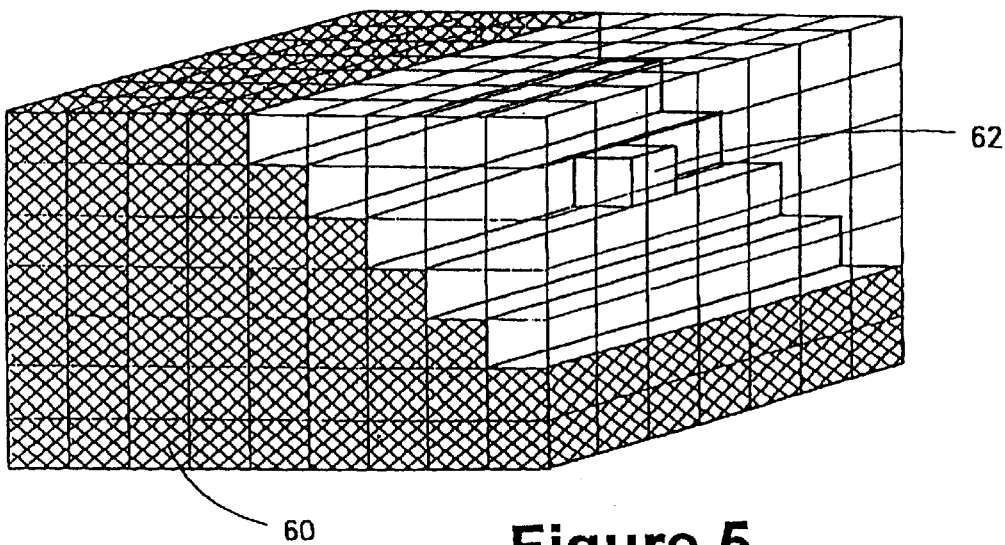
FIG. 5 is a diagram of a volumetric digital cutting tool.

Referring to FIG. 5, prior methods for sculpting volumetric data often use volumetric tools such as the illustrated carving tool. In such models, volume elements have a density of 1 where the tool is present, e.g. 60, and a density of 0 where the tool is not present, e.g. 62. The tool is therefore essentially an object which is passed through a graphical work object of interest to modify the work object. Modification may be performed by subtracting the value of the tool from the value of the work object at correlated locations within the objects as the simulated tool passes through the work object. The tool may also have partially filled elements which can result in partially filled blocks of the work object after passage of the tool through the work object.

Figure 6A:
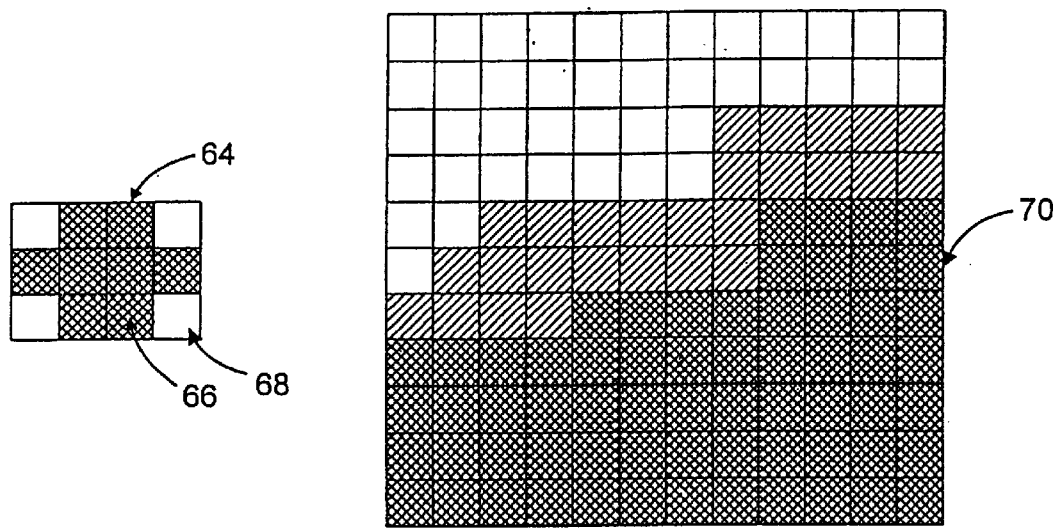
FIG. 6A is a two dimensional depiction of an array of sampled intensity values and a two dimensional depiction of a digital cutting tool.

Referring to FIG. 6A, a two dimensional version of prior methods for sculpting volumetric data shows, a two dimensional tool 64, with full elements, (e.g. 66) and empty elements (e.g. 68) and a static array of density values 70.

Figure 6B:
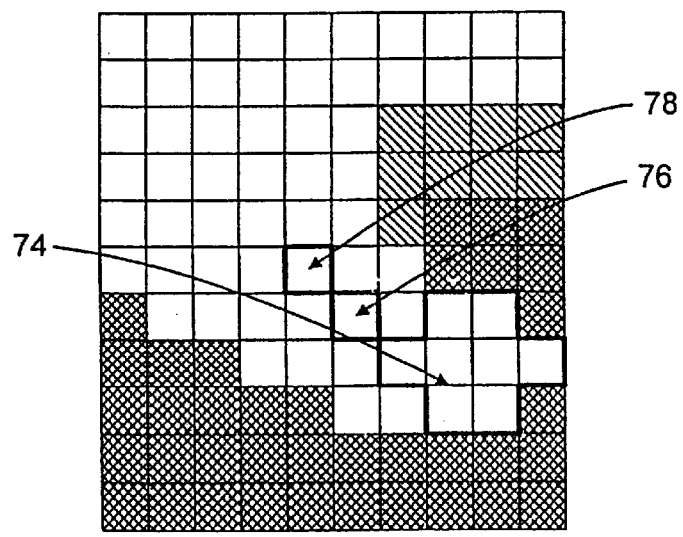
FIG. 6B is the result of dragging a carving tool along the indicated path.

In FIG. 6B, a cutting tool 72 has been swept through the array 70, along a cutting path 74, and the densities of all elements that lie along the cutting tool path 74 have been set to zero (e.g. blocks 76, 78).

Figure 6C:
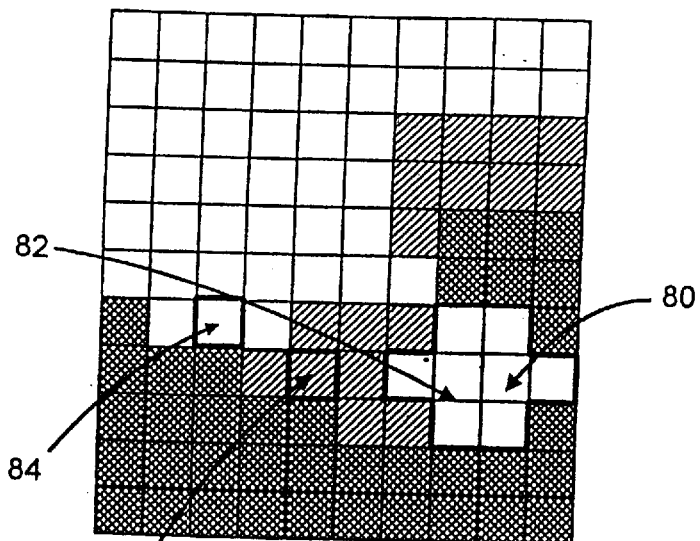
FIG. 6C is the result of dragging a melting tool along the indicated path.

In FIG. 6C, a melting tool 80, has been swept through the array 70, along a melting path 82, and the densities of all elements that lie underneath the cutting tool along the cutting path have been reduced from partially full to empty (e.g. block 84) or from full to partially full (e.g. 86).

Figure 6D:
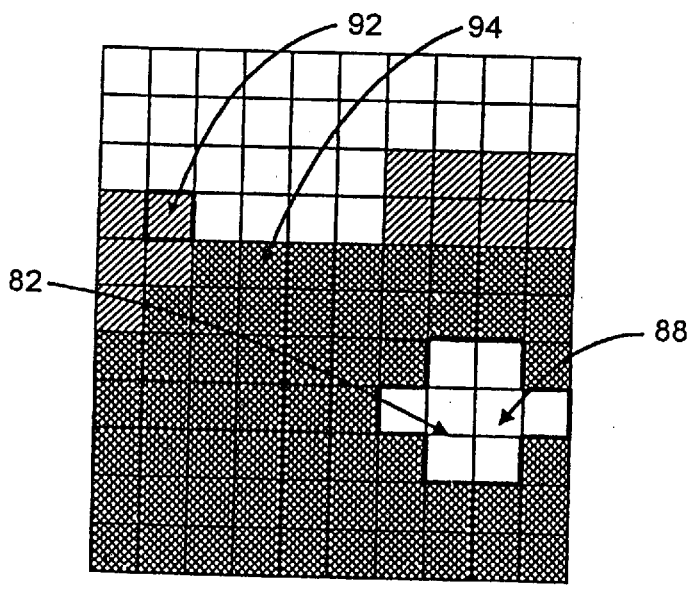
FIG. 6D is the result of dragging a spraying tool along the indicated path.

In FIG. 6D, a spraying tool 88, has been swept through the array 70, along a spray path 90, and the densities of all elements that lie along the path of the spraying tool have been increased from empty to partially full (e.g. 92) and from partially full to full (e.g. 94).

Figures 7, 9:
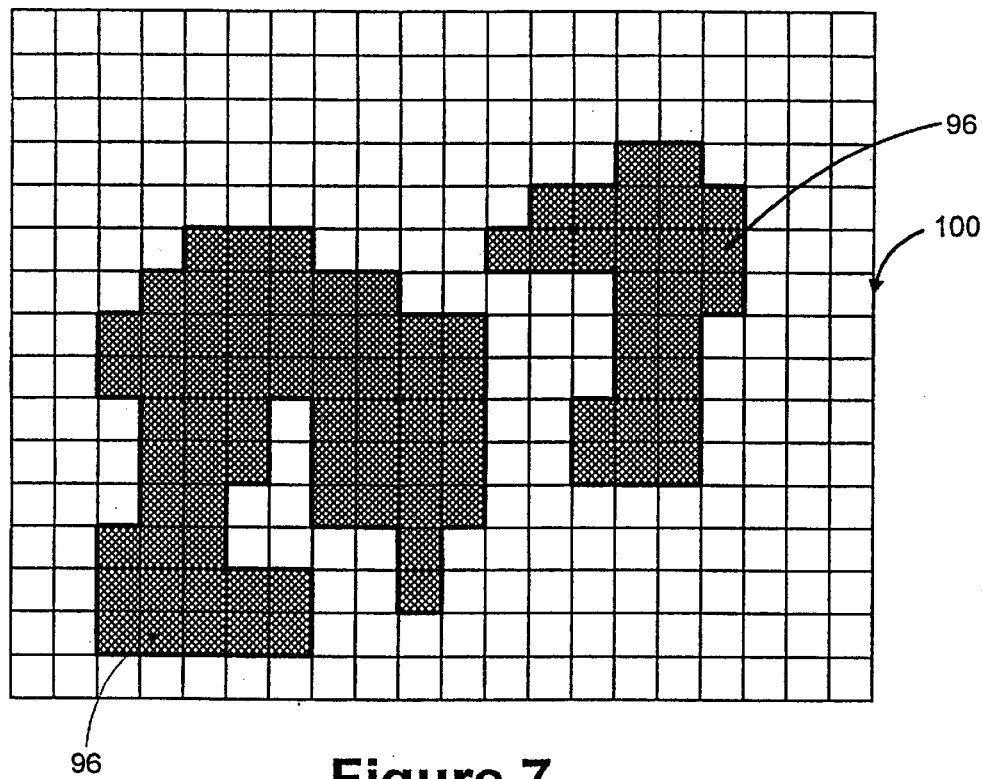
FIG. 7 is the diagrammatic view of a two dimensional array of sampled intensity values that are arranged in separate object clusters but that belong to the same data array.
FIG. 9 is a typical data structure written in the C programming language of a linked volumetric object.

As depicted in FIG. 7, in prior methods for sculpting volumetric data, it is known how to create separate clusters of non-empty elements (e.g. 96 and 98). However, these clusters remain part of the same static data array 100, and there is no means provided to consider these clusters as separate objects or to simulate interactions between such clusters.

Figure 8A:
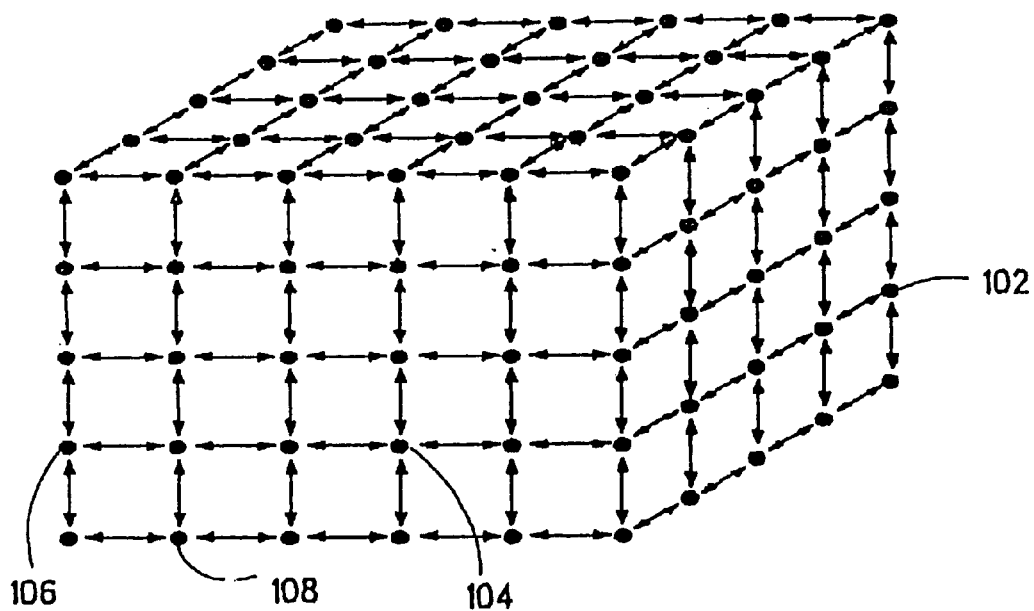
FIG. 8A is a diagram of the object representation of the subject invention where each object in the data array contains an explicit link to its neighboring elements.
Figure 8B:
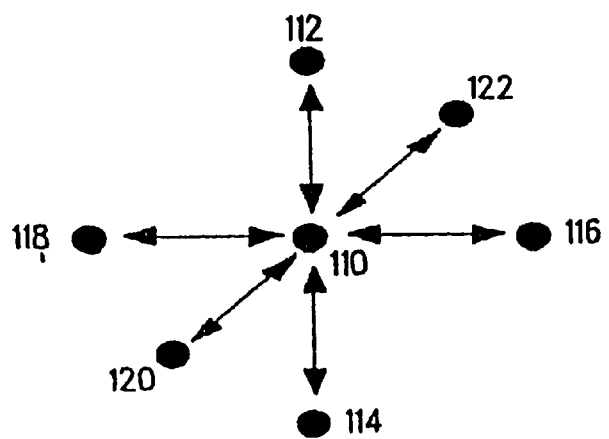
FIG. 8B is one embodiment in which a three dimensional element is linked to its 6 nearest neighbors.

In accordance with the present invention, as depicted in FIG. 8A, objects are represented as a volumetric array 102, comprising a plurality of linked elements, e.g. 104, 106, 108, etc. More specifically, referring to FIG. 8B, an element 110, is linked to its 6 nearest neighbors comprising its top neighbor 112, bottom neighbor 114, right neighbor 116, left neighbor 118, front neighbor 120 and back neighbor 122.

Referring to FIG. 9, an exemplary data structure in the C computer language is illustrated although is appreciated that any suitable data structure in any suitable programming language may be employed. The data structure includes first indicia in the form of a "float" structure which specifies the X, Y and Z coordinates for the defined element. Accordingly, the individual elements may be arbitrarily located and need not be uniformly spaced on any predetermined matrix. The exemplary data structure also includes an identification of the color of the element. More specifically, the "char" structure in the C language specifies an eight bit value. Thus, the red, green and blue content of the element color type can be specified as a mix based upon the values assigned to these variables. The data structure further specifies as a "char" structure, a "type" which may comprise a definition of the relevant tissue as muscle, bone, skin, ligament, cartilage, etc. Lastly, the data structure for each one of the elements includes pointers to adjacent neighbors, or alternatively, a NULL indicator which indicates that no link has been created with respect to an adjacent element. More specifically the pointers each identify an address which includes information such as the identification of the adjacent linked element and may include breakage limits for the respective link, deformation coefficients, etc. Data associated with each of the pointers may also include any criteria which defines properties of the respective link such as elongation with applied force, breakage limits, etc. Each element contains explicit pointers to a number of its nearest neighbors. In the presently disclosed embodiment the data structure includes pointers for up to 6 of the nearest neighbor elements which, in the exemplary data structure are identified as *right, *left, *top, *bottom, *back and *front. The ability to encode many different attributes within each element enables the modeling of different materials, structures and behaviors. For example, in the data structure of FIG. 9, the connections between an element and its right neighbor can be broken by setting the appropriate neighbor pointer to NULL. Similarly, an element and one of its neighbors can be joined together by setting their appropriate neighbor pointers to point to each other.

Figure 10:
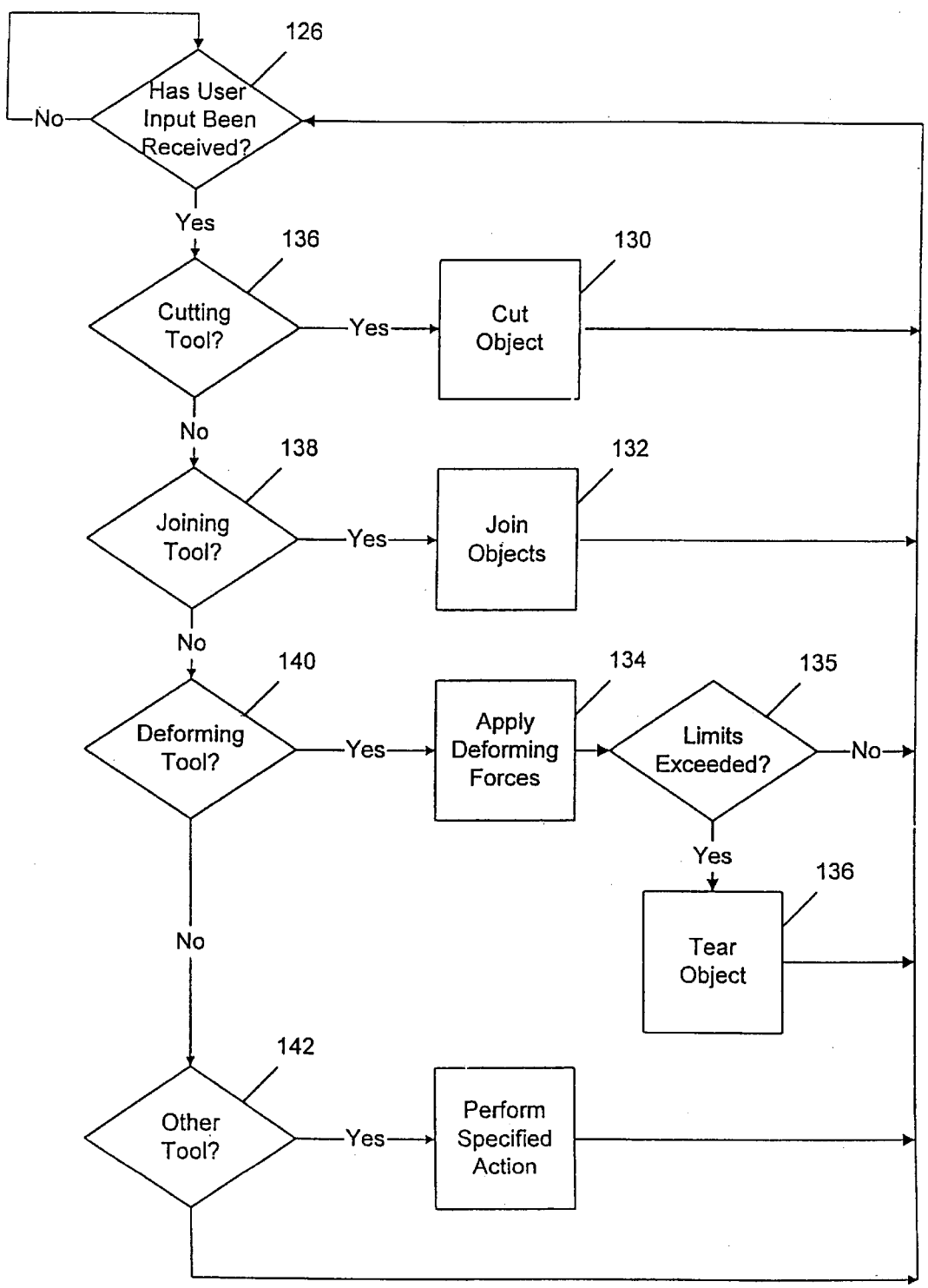
FIG. 10 is a schematic diagram of a system for manipulating volumetric graphical objects that allows object cutting, joining, and tearing.

Referring to FIG. 10, a flow chart for a graphical system for manipulating volumetric graphical objects is shown. The system consists of a user interface that waits for user input 126. If a user input is detected, such input is tested to see if it is a cutting tool, a joining tool, a deforming tool, or any other defined tool, such as a carving tool, translation tool, painting tool, etc as illustrated in inquiry steps 136, 138, 140 and 142 respectively. If the tool is a cutting tool 136, a cutting procedure is invoked as described in greater detail below with respect to FIGS. 11–13. If the tool is a joining tool, then a joining procedure is invoked as described in greater detail with respect to FIGS. 14–15. If the tool is a deforming tool, the deforming procedure is invoked as described in greater detail with respect to FIGS. 16–17. If during deformation, a material limit is exceeded as depicted in inquiry step 135 then a tearing procedure 144 is invoked as illustrated in step 136. It is understood that other tools may be employed beyond the exemplary tools described herein.

Figure 11:
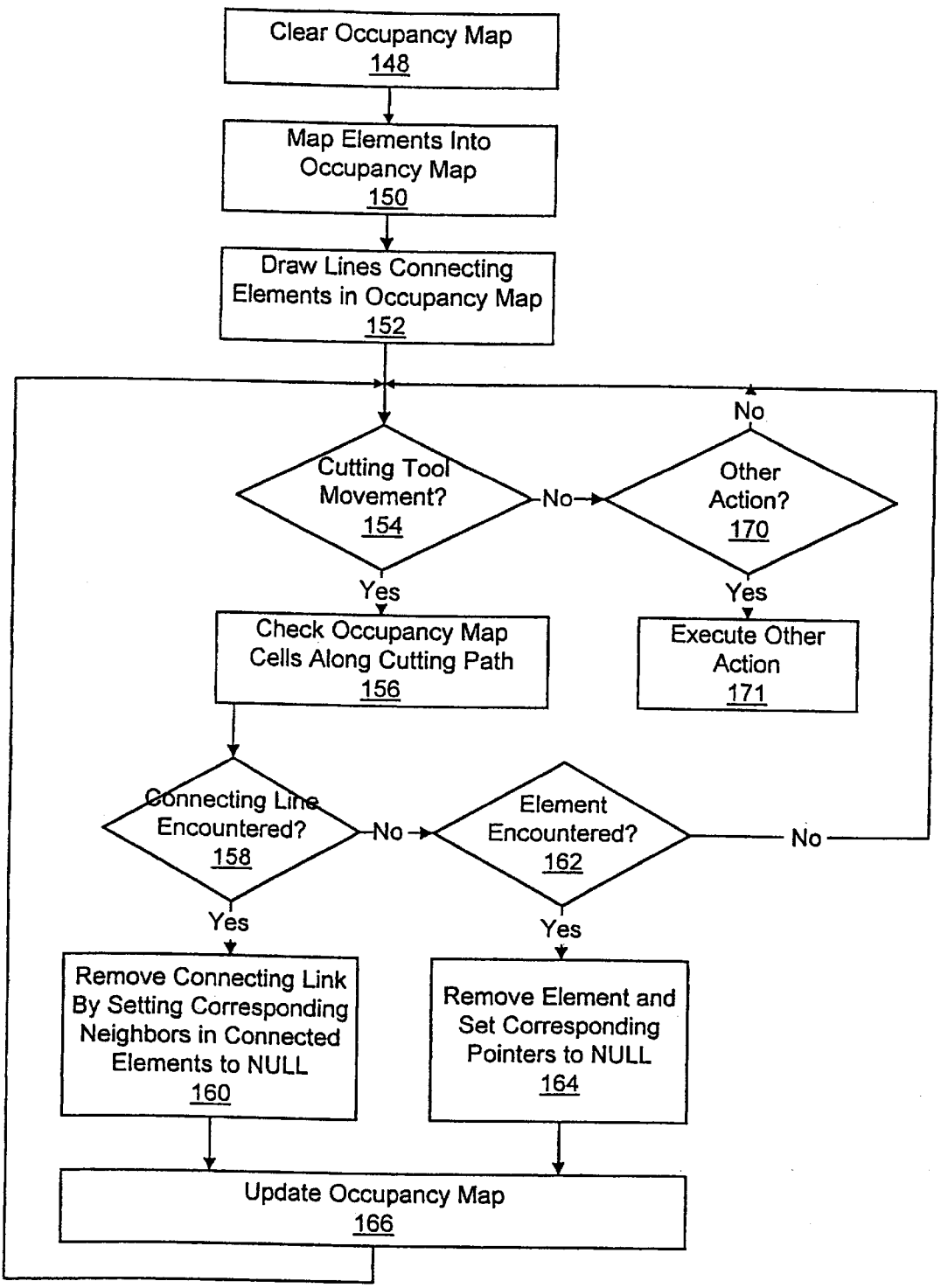
FIG. 11 is a schematic diagram of the procedure for cutting a linked volumetric object.

FIG. 11 depicts a flow chart of a cutting procedure in accordance with the present invention. First, an occupancy map that is a discrete representation of the space occupied by graphical objects in the scene is initialized by clearing it as depicted in step 148, mapping object elements into the occupancy map as illustrated in step 150, and then creating a map of connections between elements in the occupancy map as shown in step 152. When movement of the knife is detected as reflected in an affirmative response to inquiry step 154, the occupancy map beneath the path of the knife is checked for elements or connecting lines as illustrated in step 156. If a connecting line is encountered as reflected by an affirmative response to inquiry step 158, the connecting link is removed by setting the appropriate pointers in the connected elements to NULL as depicted by step 160. If a connecting line is not encountered, as reflected by a negative response to inquiry step 158, a further inquiry is made as to whether an element has been encountered as depicted in inquiry step 162. If an element is encountered as reflected by an affirmative response to inquiry step 162, the element is removed from the occupancy map and the appropriate pointers to all of the element's neighbors are set to NULL as depicted in step 164. Once the cut has been accomplished, the occupancy map is updated as illustrated in step 166 and the system checks to see if another knife movement has been detected; i.e. control passes once again to inquiry step 154. If an action other than the cutting action is detected, the processing routine corresponding to the detected action is invoked as depicted by step 170.

Figure 12A:
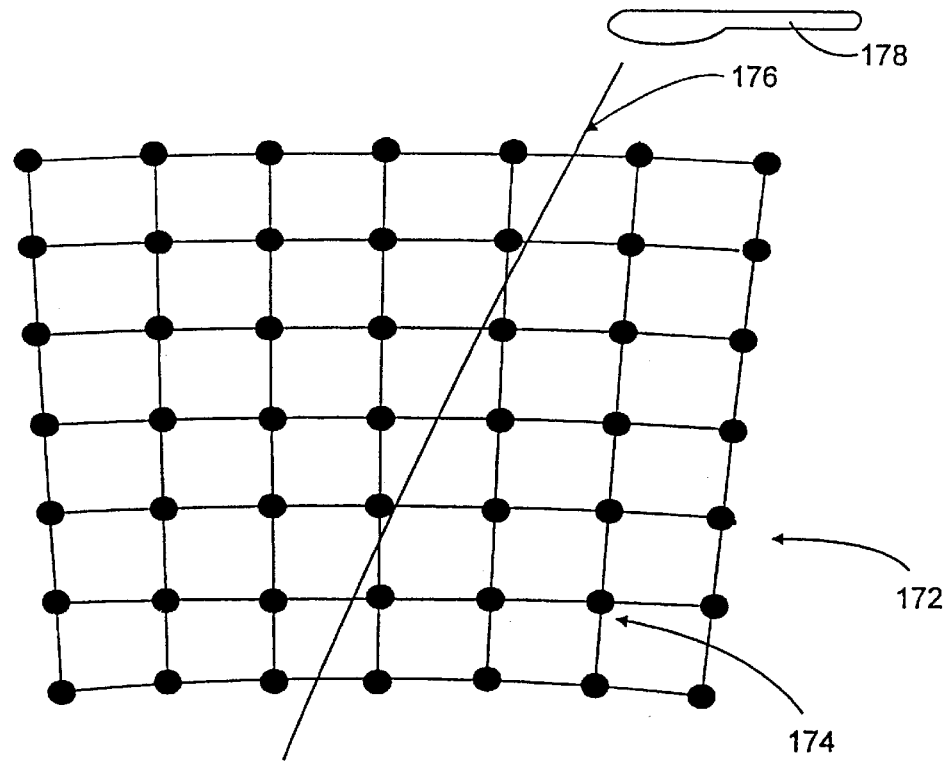
FIG. 12A is a diagrammatic description of a two dimensional array of linked elements and the path of the cutting tool.
Figure 12B:
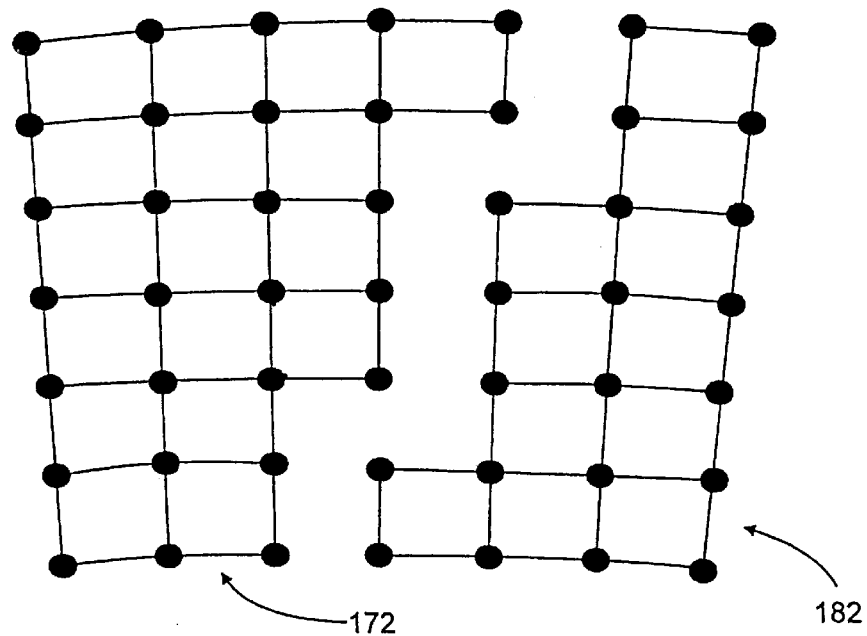
FIG. 12B depicts the two liked element objects that result from the given cutting path.

Referring to FIG. 12A, a two dimensional array 172, of linked elements, e.g. 174, is depicted along with the path 176 of a cutting tool 178. In FIG. 12B, the resultant separate linked objects, 180 and 182, are depicted.

Figure 13A:
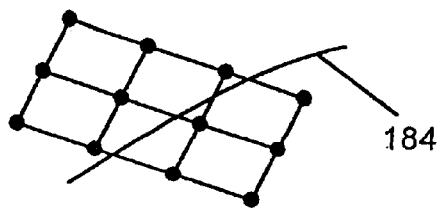
FIG. 13A is a diagrammatic description of a two dimensional array of linked elements and the path of the cutting tool.
Figure 13B:
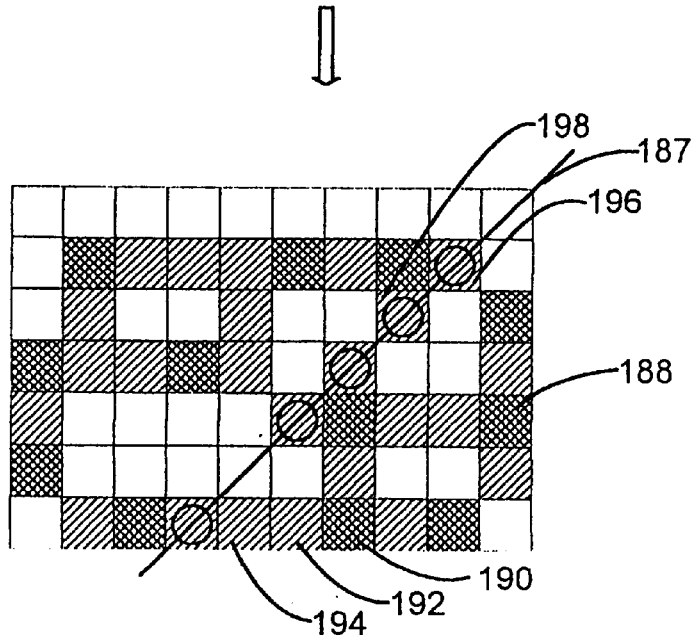
FIG. 13B represents the space in which collisions between the object elements, the connecting links, and the cutting path are detected.

Referring to FIG. 13A, a two dimensional array of linked elements and a cutting path 184 of a cutting tool is depicted. In FIG. 13B, an occupancy map 186, is depicted with the cutting path 187, superimposed. Elements of the object are mapped as dark cells, e.g. 188 and 190, and lines connecting adjacent elements are mapped as light cells, e.g. 192 and 194 using a line-drawing algorithm. Occupied cells that are intersected by the cutting path 187, are indicated by circles, e.g. 196 and 198. These intersections indicate which elements or connecting links must be removed from the object model.

Figure 13C:
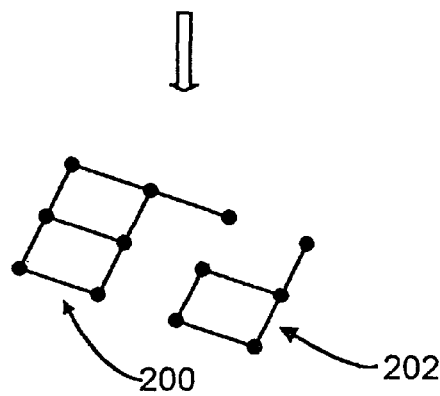
FIG. 13C shows the resultant cut objects for the given cutting path.

In FIG. 13C, the resultant objects comprising first and second object pieces, 200 and 202, as derived from the occupancy map, are illustrated.

Figure 14:
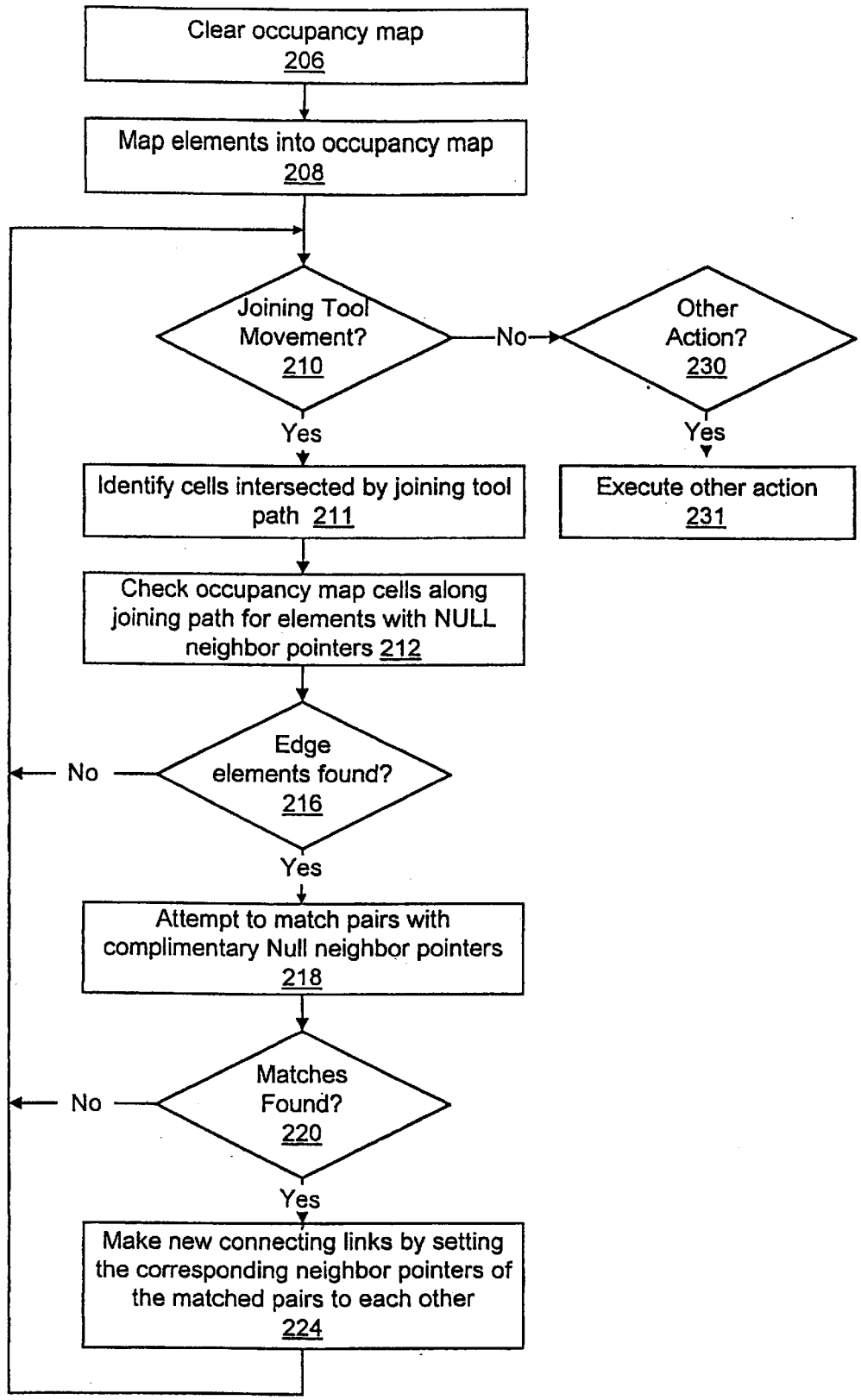
FIG. 14 is a schematic diagram of the procedure for joining two linked volumetric objects.

FIG. 14 is a flow chart which illustrates a technique for joining volumetric objects via use of the presently disclosed volumetric representation. As illustrated in step 206, the occupancy map is initialized by clearing it. Subsequently, as depicted in step 208, object elements are mapped into the occupancy map. When movement of a joining tool is detected as reflected by an affirmative response to inquiry step 210, cells intersection by the joining tool path are identified as indicated in step 211. As illustrated in step 212, the locations of the occupancy map along the joining tool path is searched for edge elements having NULL neighbor pointers as illustrated in step 212. An edge element is defined as one with neighbor pointers having a NULL value (or any other value providing a "no connection" indication"). If no edge elements are found as reflected by a negative response to inquiry step 216, control passes to step 210 and the system waits for further tool movement. If edge elements are detected along the path of the joining tool as reflected by an affirmative response to inquiry step 216, the edge elements are searched for adjacent elements that have corresponding missing neighbors 218 as illustrated in step 218. If no matches are found as reflected by a negative response to inquiry step 220, control passes to step 210 and the system waits for further tool movement. If matches are found as reflected by an affirmative response to inquiry step 220, new links are created between the matched elements by setting their appropriate neighboring pointers to point to each other as depicted in step 224. After new links have been made for elements to be jointed, control passes to step 210 and the system wait for further tool movement, 226. If no joining tool movement is detected, but another input action is detected as reflected by an affirmative response to inquiry step 230, the joining procedure is exited and a processing routine is invoked to process the other input action.

Figure 15A:
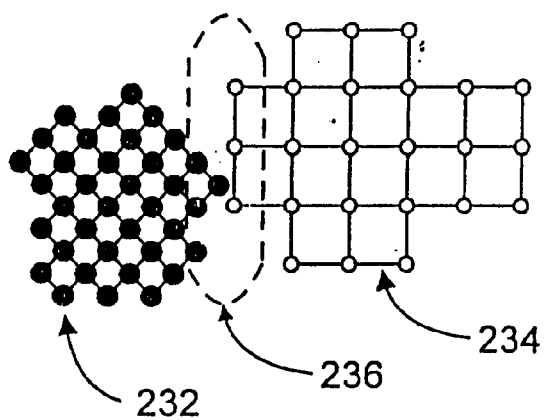
FIG. 15A depicts two different two dimensional linked objects that have been placed near to each other and the area on which the joining compound has been applied.
Figure 15B:
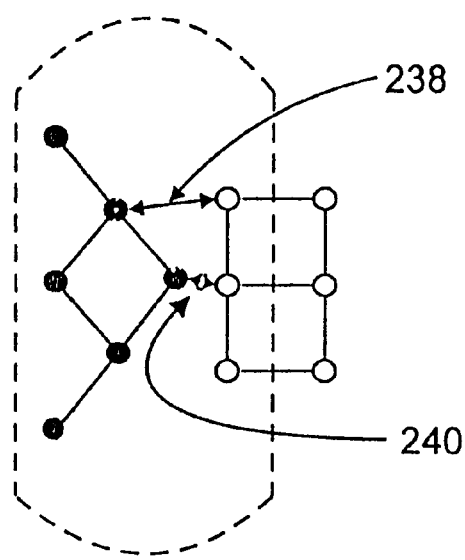
FIG. 15B shows the new links that have been formed to join the two graphical objects.

Referring to FIG. 15A, two-dimensional linked objects, 232 and 234, are depicted in close contact. The region under the joining tool is depicted by the dotted outline 236. In FIG. 15B, two new links 238 and 240, are shown that were made by matching edge points of the two objects that had corresponding missing neighbors.

Figure 16:
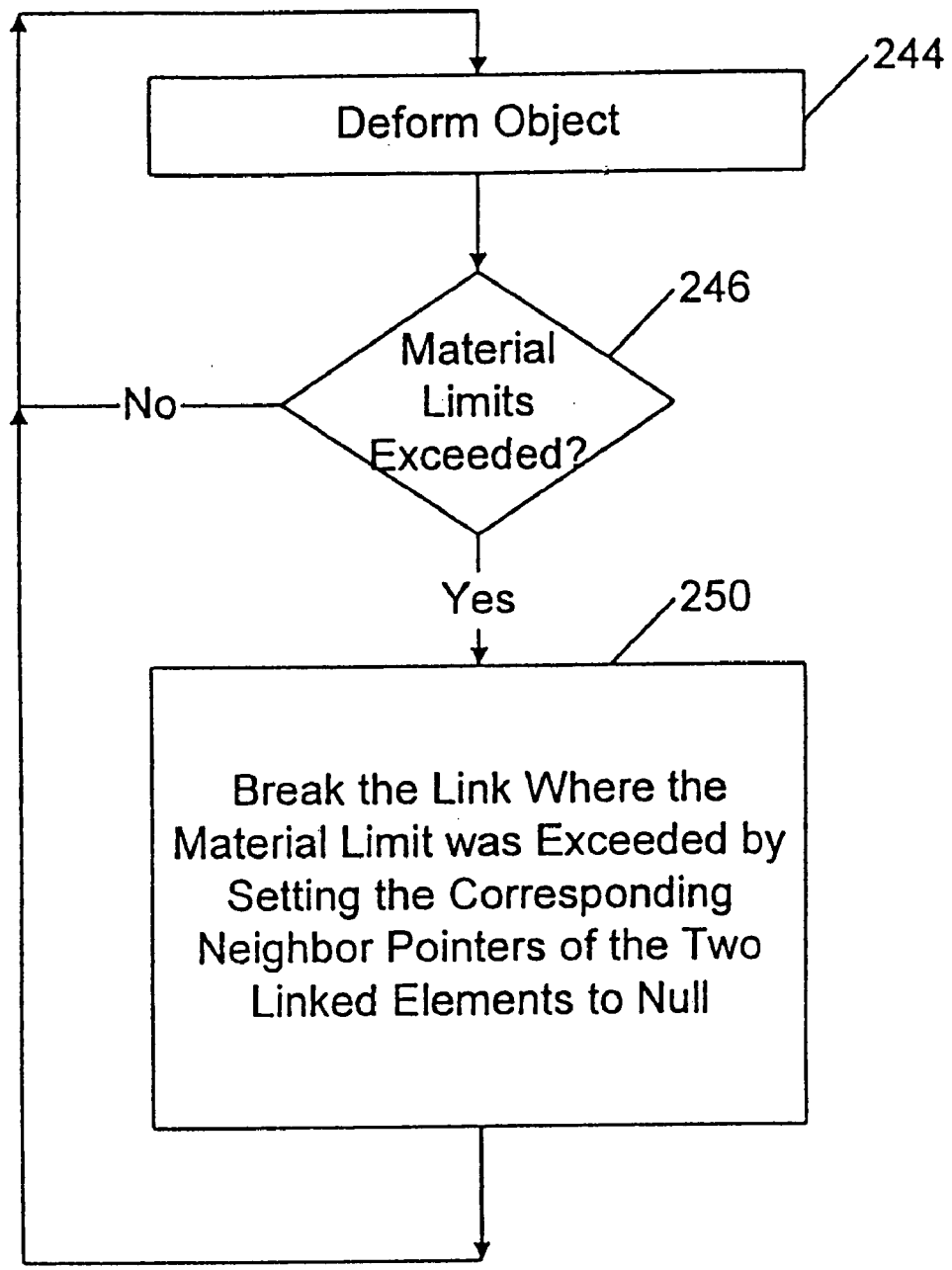
FIG. 16 is a schematic diagram of the procedure to tear an object during object deformation.

A flow chart of a technique for tearing a deforming object, 242, is depicted in FIG. 16. When the object is being deformed as depicted in step 244, links are tested to determine if material limits are exceeded as illustrated by inquiry step 246. If material limits are exceeded as reflected by an affirmative response to inquiry step 246, the object is torn as illustrated by step 250. More specifically, the connections are broken in the occupancy map at the locations where the material limits are exceeded by setting the appropriate neighbor pointers of the connected elements to NULL.

Figure 17A:
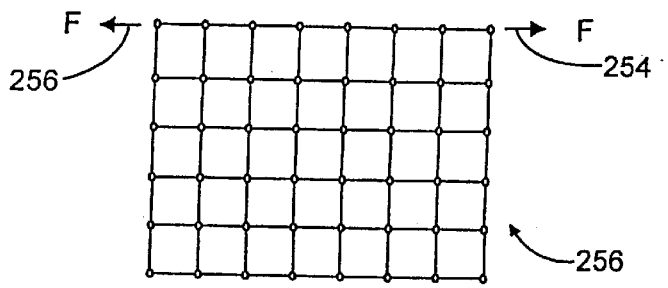
FIG. 17A depicts a two dimensional array of linked elements and the forces applied at the top corners of the object to pull the object apart.
Figure 17B:
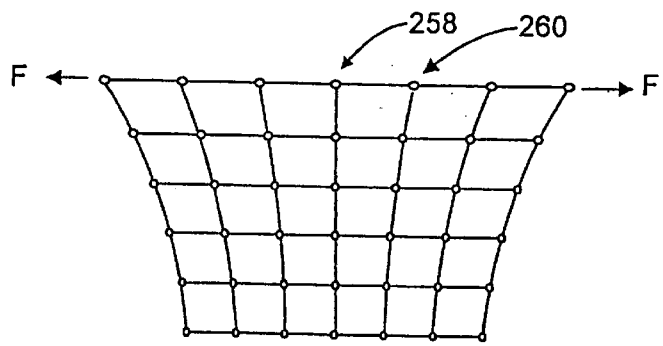
FIG. 17B. shows the object being stretched apart by the corner forces.
Figure 17C:
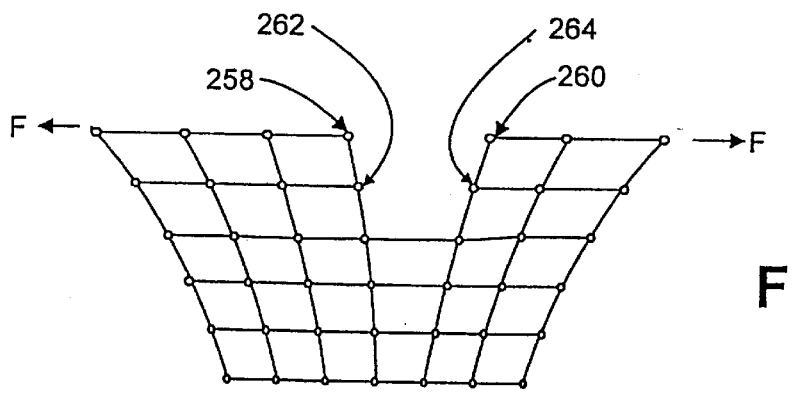
FIG. 17C shows a tear beginning to form where link distances between two sets of neighbors have exceeded material limits.
Figure 17D:
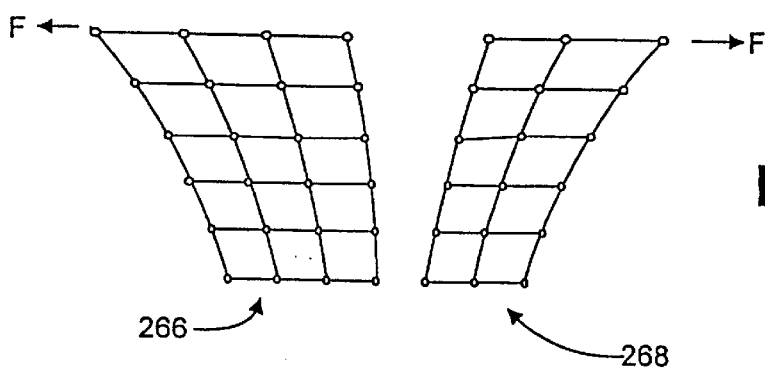
FIG. 17D shows the two separate pieces of the torn object after the tear is completed.

Referring to FIG. 17, The tearing of a two dimensional linked element object is depicted in FIGS. 17A through 17D. In FIG. 17A, two forces 252 and 254, are applied in opposite directions to the two top corners of the object generally designated 256. In FIG. 17B, the object is stretched to the maximum limits of the link between elements 258 and 260. The limits may be established in the form of a force at which the link is broken or as a distance threshold. If the distance between the connected elements exceeds the distance threshold, the link is considered to be broken. In FIG. 17C, the connecting links between adjacent elements 258 and 260, and 262 and 264 have been broken. In FIG. 17D, the object has been torn into two separate pieces, 266 and 268.

It will be apparent to those of ordinary skill in the art that variations to and modifications of the presently disclosed techniques for modeling graphical objects and the techniques for simulation of the manipulation of such objects such as by cutting, joining and tearing of the objects are possible without departing from the inventive concepts disclosed herein. Accordingly, the invention herein disclosed is not to be viewed as limited to the exemplary embodiment but rather solely by the scope and spirit of the appended claims.

What is claimed is:

1. A method for generating a graphical representation of an object which may be graphically displayed and manipulated via the use of simulated tools on a video display of a computer comprising the steps of:

storing in a map within a memory, a plurality of first indicia indicative of the presence of a corresponding plurality of elements of said object at selected locations within said map;

generating second indicia associated with each one of at least one pair of said plurality of elements, said second indicia being representative of links between said pair of elements to form a graphical representation of said object; and storing said second indicia for each one of said pair of elements in said map; and displaying on said video display a graphical representation of said object based upon the contents of said map within said memory.

2. The method of claim 1 wherein each of said second indicia comprises an identification of the other element of said pair of elements.

3. The method of claim 1 wherein said method further includes the steps of:

generating a graphical representation of a change to said object on a display of a computer in response to the simulated application of a tool by a user; and manipulating said first and second indicia in response to said user input to affect said displaying step.

4. The method of claim 3 wherein said generating step comprises the step of:

generating third indicia representative of a graphical representation of the drawing of a line along a path through said object via use of a simulated cutting tool;

correlating said third indicia to said first and second indicia of selected ones of said elements within said map; and modifying selected ones of said first and second indicia within said map to indicate that selected ones of said elements and links have been eliminated.

5. The method of claim 3 wherein said generating step comprises the step of:

generating third indicia representative of a graphical representation of the drawing of a line along a path through said object on said display via use of a simulated melting tool;

correlating said third indicia to said first and second indicia of selected ones of said elements within said map; and in response to said correlating step, modifying the values of said first and second indicia at selected locations within said map.

6. The method of claim 5 wherein said modifying step comprises the step of changing the value of at said second indicia for at least one link from a first value to a second value in response to said correlating step to indicate that the respective link has been weakened in response to said correlating step.

7. The method of claim 5 wherein said modifying step comprises the step of changing the value of at least one location within said map corresponding to at least one link from a first value to a second value to indicate that the respective link has been severed in response to said correlating step.

8. The method of claim 3 wherein at least some of said second indicia associated with corresponding ones of said links include an identification of a force threshold at which point the respective link is simulated as being severed if a simulated force in excess of the respective threshold is indicated as being applied to the respective link, said generating step comprises the step of:

in response to a user input to said computer representative of forces applied to selected elements of said object, generating values representative of forces applied to at least some of said links;

comparing said applied forces to the corresponding force thresholds for the respective ones of said at least some of said links; and changing said second indicia from a first value to a second value for the respective links for which said comparing step indicates the applied force exceeds the respective force threshold to indicate that the respective links have been severed.

9. The method of claim 3 wherein at least some of said second indicia associated with corresponding ones of said links include an identification of a distance threshold associated with the respective links, said method further comprising the steps of:

in response to a user input to said computer representative of forces applied to selected elements of said object, generating values representative of the length of said respective links;

comparing said lengths of the respective links to the distance threshold for each of the respective links; and changing said second indicia from a first value to a second value for the respective links for which said comparing step indicates the length of the respective link exceeds the distance threshold to indicate that the respective links have been severed.

10. The method of claim 1 wherein at least some of said elements have associated links to four adjacent elements.

11. The method of claim 1 wherein said second storing step further comprises the step of storing in said memory, second indicia representative of links between at least one of said elements and four adjacent elements within said map.

12. The method of claim 1 wherein said second storing step further comprises the step of storing in said memory, second indicia representative of links between at least one of said elements and six adjacent elements within said map to form a graphical representation of a portion of said object which comprises a three dimensional object.

13. The method of claim 3 wherein said generating step comprises the step of:

generating a graphical representation of a path through said object on said display representative of the path of a simulated joining tool;

comparing said path to the location of said elements within said occupancy map to identify pairs of adjacent unlinked elements on opposite sides of said path;

modifying the second indicia for said adjacent unlinked element pairs from a first value to a second value to indicate that said adjacent formerly unlinked element pairs are linked as a result of the passage of the simulated joining tool therebetween.

14. A method for generation of a graphical representation of an object for display and simulated manipulation of the graphical object on a video display of a computer via the use of simulated tools comprising the steps of:

storing in a memory a plurality of data structures corresponding to respective elements of said object, each of said data structures comprising a data representation of the position of the respective element and a plurality of pointers to other locations within said memory; wherein said locations are associated with other ones of said plurality of elements, and in a second storing step, storing at a location in said memory associated with one of said pointers of a first one of said plurality of data structures, an identification of a second one of said plurality of data structures, and storing at a location in said memory associated with one of said pointers of said second one of said plurality of data structures an identification of said first one of said plurality of data structures to indicate that said first and second elements are linked together within said object;

displaying on said video display a graphical representation of said object based upon the contents of said data structures.

15. The method of claim 14 wherein said second storing step further comprises the step of overwriting said location in said memory associated with said one of said pointers of said first one of said plurality of data structures, a first value and storing at said location in said memory associated with said one of said pointers of said second one of said plurality of data structures a second value, wherein said first and second values indicate that the respective element is not linked to the other one of said elements.

16. The method of claim 15 wherein said first and second values comprise a NULL value which does not identify another one of said elements.

17. The method of claim 14 further including the step of storing at a location in said memory associated with one of said pointers of a first one of said plurality of data structures, data indicative of the color of said element.

18. The method of claim 14 wherein said data indicative of said color of said element further comprises values representative of red, green and blue components defining said color.

19. The method of claim 14 further including the step of storing at a location in said memory associated with one of said pointers a value indicative of a force threshold;

simulating the application of forces to said object to produce simulated forces on respective links corresponding to at least one of said pointers;

removing said identification of at least said second one of said plurality of data structures from said memory in the event the simulated force on the respective link exceeds the force threshold for the respective link corresponding to said at least one of said pointers.

20. A method for generating a graphical representation of a volumetric array of elements where each element is stored in a memory as a density value, comprising the steps of:

explicitly storing a location of each element with each said density value to enable elements to be arbitrarily located; and explicitly storing pointers to adjacent elements with each said density value to enable elements to be arbitrarily connected.

* * * * *